United States Patent [19]

Lafferty et al.

[11] Patent Number: 5,167,476
[45] Date of Patent: Dec. 1, 1992

[54] COLLET AND TOOL ASSEMBLY

[75] Inventors: James Lafferty; Robert DeLong, both of Glendale, Calif.

[73] Assignee: Dalton Technology, Glendale, Calif.

[21] Appl. No.: 614,542

[22] Filed: Nov. 16, 1990

[51] Int. Cl.⁵ .............................. B23B 31/20
[52] U.S. Cl. .................... 408/240; 408/127; 408/226; 279/42; 279/80
[58] Field of Search ............ 279/1 A, 1 ME, 48, 1 Q, 279/93, 42, 41, 89, 46, 26, 27, 79, 80; 408/127, 714, 237 R, 239 A, 240, 226, 141, 202, 222; 433/128, 127, 147, 146; 81/438, 439, 177.6, 177.85; 10/198

[56] References Cited

U.S. PATENT DOCUMENTS

| | | | |
|---|---|---|---|
| 213,662 | 3/1879 | Johnson et al. | 433/128 |
| 233,709 | 10/1880 | Starr | 433/128 |
| 287,683 | 10/1883 | Gilbert | 433/128 |
| 308,424 | 11/1884 | Morey | 433/128 X |
| 583,625 | 6/1897 | Lusby | 433/128 X |
| 666,509 | 1/1901 | Furbish | 279/79 |
| 691,449 | 1/1902 | Craig | 279/80 |
| 861,423 | 7/1907 | Ayers | 81/438 X |
| 1,377,288 | 5/1921 | Soresi | 51/170 |
| 1,425,270 | 4/1921 | Morgan | 279/76 X |
| 1,853,089 | 4/1932 | Skinner | 433/128 X |
| 2,896,956 | 7/1959 | Ann | 279/46 |
| 3,036,839 | 5/1962 | Williamson, Jr. | 279/48 |
| 3,645,642 | 2/1972 | Koslow | 408/202 |
| 4,211,510 | 7/1980 | Hopkins | 279/6 X |
| 4,990,038 | 2/1991 | DeLong | 408/127 |

FOREIGN PATENT DOCUMENTS

| | | | |
|---|---|---|---|
| 13646 | 7/1980 | European Pat. Off. | 279/46 R |
| 260491 | 1/1928 | Italy | 279/48 |
| 270102 | 3/1934 | Italy | 279/80 |
| 605130 | 7/1948 | United Kingdom | 81/438 |

Primary Examiner—Larry I. Schwartz
Assistant Examiner—Robert Schultz
Attorney, Agent, or Firm—Wagner & Middlebrook

[57] ABSTRACT

A collet and tool assembly for rotatable tools such as drills and taps in which the collet and tool each include mating:

a) stops for limiting entrance of the tool into the holder;
b) matching detents for producing an audible click when the tool is properly placed in the collet; and
c) matching eccentric sections which provide positive torque transfer between the collet and the tool.

8 Claims, 3 Drawing Sheets

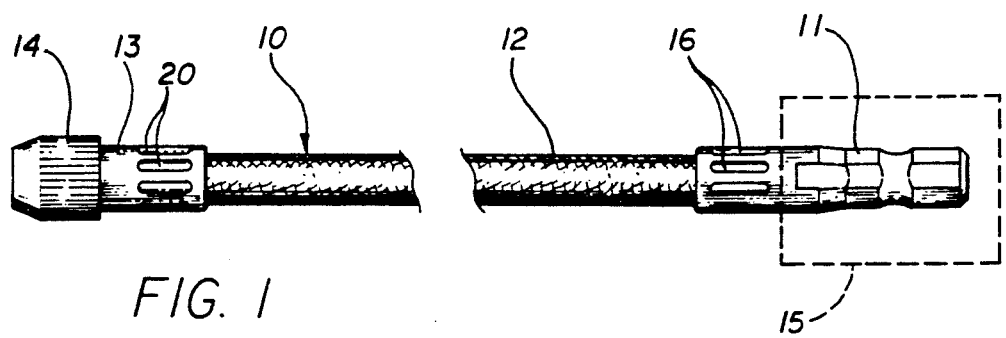
FIG. 1
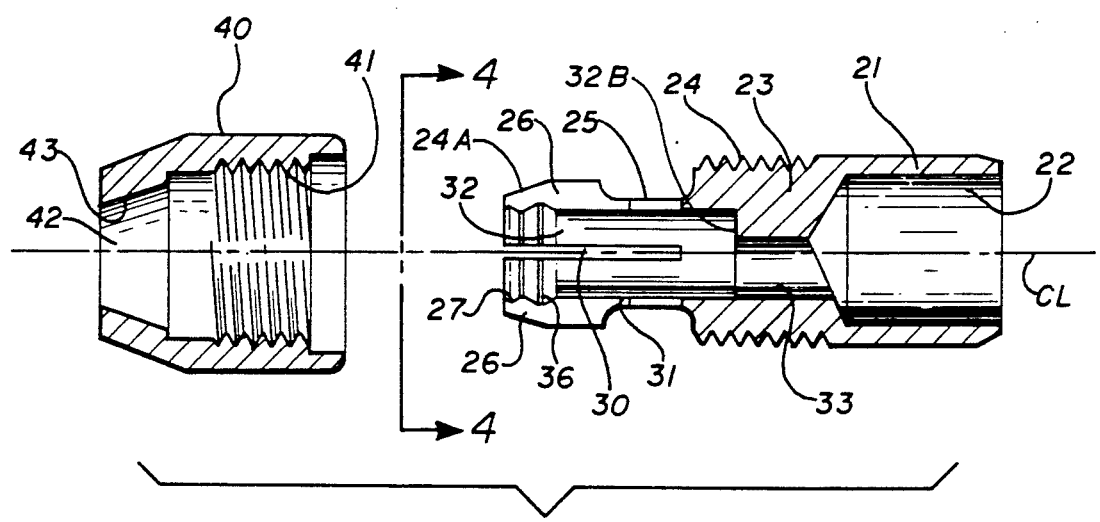
FIG. 2
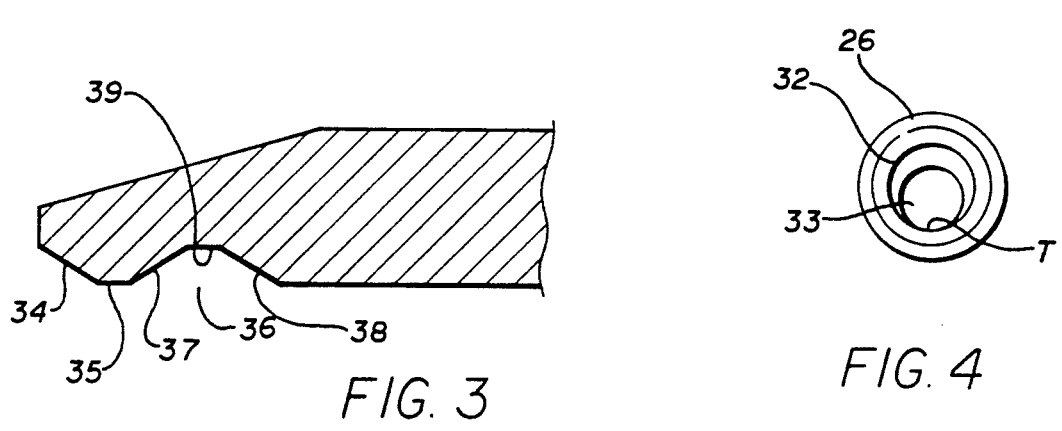
FIG. 3
FIG. 4

COLLET AND TOOL ASSEMBLY

BACKGROUND OF THE INVENTION

In the orthopedic implant field, the replacement of entire human skeletal joints is well established as every day surgical procedures calling for the permanent attachment of metallic joint parts to the existing bone structure. A usual method of attachment, particularly in the case of total hip joint replacement, employs metal screws of various diameters and lengths. The placement of such screws requires that a precisely located pilot hole is driven into the bone structure at the correct angle and depth and diameter as specified by the manufacturer of the implant part and subject to the operating surgeon's evaluation of the bone condition as observed in both pre-operation x-rays and upon opening the joint. As many as three screws may be inserted to hold an acetabular cup in place and of the correct diameter and length. This can require the surgeon to rapidly select the correct drill bit, hold it at the correct angle with the help of a drill guide and drill to the correct depth. The latter requirement is aided by the choice of several drill bit lengths and using the correct bit, drill until the drill holder bottoms out on the drill guide.

The surgeon may be forced to make several drill bit changes in a single operation. Existing bits require his visual attention as well as the use of both hands to make a bit change, if he does so himself. Otherwise, he must rely upon other operating room personnel to rapidly exchange bits and install the bits properly, particularly to produce the correct diameter and depth hole.

Some drill bits include flexible shafts as a permanent part of the bit, increasing their cost significantly and require the discarding of not only the bit but the flexible shaft when the normally unresharpened bit becomes dull.

Other types of drill bits have accomplished a degree of modularity in that the bit is separate from the flexible drive and uses a form of collet. Longitudinal positioning and torque transfer to the bit is achieved via a cross bar which is brazed in a transverse hole in the bit shank. This type of bit and collet assembly is a step forward but it requires the removal of a part of the collet assembly with each bit change. It also allows a bit to be placed in the collet without being secured either longitudinally or in torque transfer relationship. This might only be discovered as the surgeon begins drilling erratically—truly an unsatisfactory situation.

BRIEF DESCRIPTION OF THE INVENTION

Faced with the foregoing state of the art, I was convinced that it was possible to produce a truly reliable modular collet and tool combination which meets the needs of the operating theatre for orthopedic surgery. A positive connection between a drive system and interchangeable and disposable tools such as bone drill bits and taps can be accomplished. Likewise, I was convinced that interchangeable tools can be devised which may be changed in a collet type holder with assurance merely by touch and audibly that the tool is properly seated and ready for immediate use. I knew that such a combination could be achieved in which tools may be exchanged in a matter of seconds without the user having to remove his eyes from the subject of interest, namely the patient and the operating field.

These are all accomplished in a collet chuck including a body having a tool receiving recess defined in part by flexure expandable jaws having an internal detent recess and a tool seating reference surface. Additionally, the tool receiving recess includes a longitudinally extending eccentric recess as well as a positive end surface at the entrance level of the longitudinally extending eccentric recess.

The collet of this invention is used in combination with tools having as their attachment end, a) a stop for engaging the tool seating reference surface of the collet, b) a detent for engaging the detent recess of the collet, and c) an asymmetrical extension which contacts the positive end surface of the tool receiving recess and only upon registration with the longitudinally extending eccentric recess of the collet allows the detents to engage with an audible sound. Thereupon the tool is locked longitudinally at a precise position and in positive torque transmitting relationship with the collet via the eccentric extension.

A locking ring on the collet may be tightened about the jaws of the collet to further secure the tool in place.

BRIEF DESCRIPTION OF THE DRAWING

This invention may be more clearly understood from the following detailed description and by reference to the drawing in which:

FIG. 1 is a side elevational view of a flexible shaft drive for use principally in the placement of orthopedic implants and incorporating this invention;

FIG. 2 is a longitudinal sectional view of the collet portion of the drive of FIG. 1;

FIG. 3 is a fragmentary enlarged sectional view of the jaw detail of the collet of FIG. 2;

FIG. 4 is an end view of the collet of FIG. 2 viewed in the plane defined between the arrows 4—4 of FIG. 2;

DETAILED DESCRIPTION OF THE INVENTION

Figure 5:
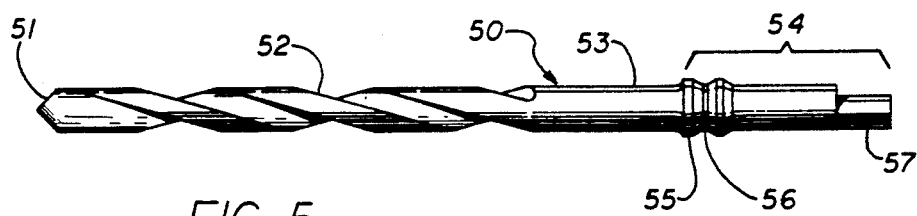
FIG. 5 is a side elevational view of a tool namely, a drill bit of this invention and designed to be held in the collet of FIGS. 1-4.

This is an invention, as indicated above, which is directed toward a modular system of a collet and tools for use particularly in combination with a flexible shaft drive for medical purposes. The use of this system is intended principally in the placement of orthopedic implants and particularly in the surgical procedure of total hip replacements, for example, the placement of the acetabular shell component of a hip joint replacement. The collet of this invention and, for that matter, the tools employing the mating proximal and attachment feature may be used in surgical, dental and other applications where there is a need for the precise positioning, locking and driving of a drill or tap along with its rapid and reliable exchange of tool under stressful conditions of use.

A typical flexible drive assembly generally designated 10 is shown in FIG. 1. It comprises a proximal end adaptor 11, a flexible shaft portion 12, a distal end collet assembly 13 with its collet ring 14. The adaptor 11 may be of any type designed to mate with a drive source which is indicated generally by dash lines 15. The adaptor 11 is FIG. 1 is of the Zimmer-Hudson type which is well known in the orthopedic field. The adaptor 11 is secured to the flexible shaft 12 by any of a number of methods such as welding or brazing but the preferred method of crimping is illustrated in FIG. 1 by the crimp indentations 16. The attachment portion of adaptor 11 has an end recess corresponding in diameter to receive the flexible shaft 12 and is sufficiently thin walled that using crimping techniques, the adaptor 11 may be crimped about and permanently secure the adaptor 11 to the flexible shaft 12. One type of flexible shaft 12 is made up of a plurality of overlying reversely wound layers of wire such as stainless steel about a single axially extending stainless steel wire to provide a virtually solid but highly flexible length. In a typical example, the flexible shaft portion 12 having an outside diameter of $\frac{1}{4}$ inch and a 4 inch length can easily bend through a 45° degree angle and effectively drive the collet in both a forward or reverse direction without backlash or danger of destruction of the flexible drive.

At the distal end of the flexible shaft member 12, the collet assembly 13 is similarly secured to the flexible shaft by such means as crimping as represented again by the crimp grooves 20. The attachment by crimping is accomplished at the thin walled section 21 which may be seen in FIG. 2, to which reference is now made in conjunction with FIGS. 3 and 4. The collet assembly 13 defines the recess 22 into which a flexible shaft distal end is inserted prior to crimping and in its body portion 23, includes external threads 24 for engaging and mating internal threads 41 of locking ring 40. Forward of the threads 24, in the distal direction is a necked down region 25 constituting the expandable flexure portion of a split collet jaw 26. In FIG. 2, two of the four jaw portions 26 may be seen. Four jaw sections are preferred produced by two orthogonal transverse diametrical slots 30 and 31. Three, four or even, for that matter, six jaw portions may be used.

The jaw portion 26 includes a frusto conical surface 27 which acts both as a guide for entrance of a tool and as a stop limiting the longitudinal intrusion of the tool into the collet.

We have found that four jaw portions 26 are effective in carrying out this invention. The jaw portions are defined by an internal axial bore 32 which defines the thickness of the flexure region 25 and its degree of resiliency. An additional bore 33 is eccentric with respect to the collet center line CL and the function of which will be made clearer in connection with the descriptions of the tools of FIGS. 5 and 8.

As best seen in FIG. 3, the jaw portions 26 include a plurality of discrete surfaces, namely, a frusto conical throat 34, a flat 35 and a detent recess 36 defined for simplicity by stops 37 and 38 separated by flat 39.

Note that the bottom surface 32b of recess 32 is planar and intersects the opening of recess 33. Otherwise note from FIG. 4 that the recess 33 is tangent to the recess 32 at line T and, therefore, forms a continuation of recess 32 at one line only, namely, at the bottom of FIG. 4.

The locking ring 40 of FIG. 2 has an aperture 42 therethrough to allow the jaw portions 26 of the collet assembly 13 to extend through the ring 40 and includes an internal frusto conical surface 43 which engages a mating external surface 26a of the jaw portion 26 of collet 11. The locking ring 40 is dimensioned so that threads 41 when tightened on threads 24 of the collet engage and hold the jaw portions 26 from opening when the locking ring 40 is drawn tight on the collet body 23. When in the full lock position as illustrated in FIG. 1, the jaws 26 may not open, similar to conventional collet operation.

Figure 6:
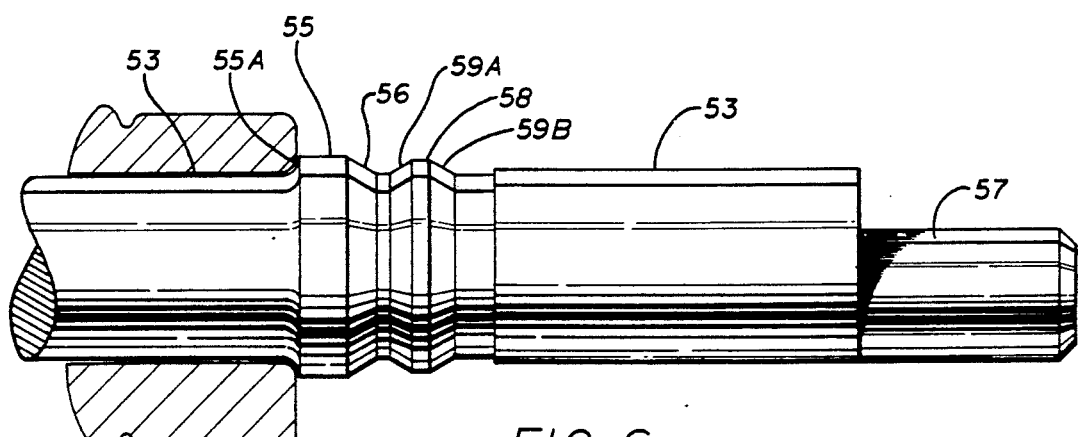
FIG. 6 is an enlarged fragmentary view of the attachment portion of the tool of FIG. 5.
Figure 7:
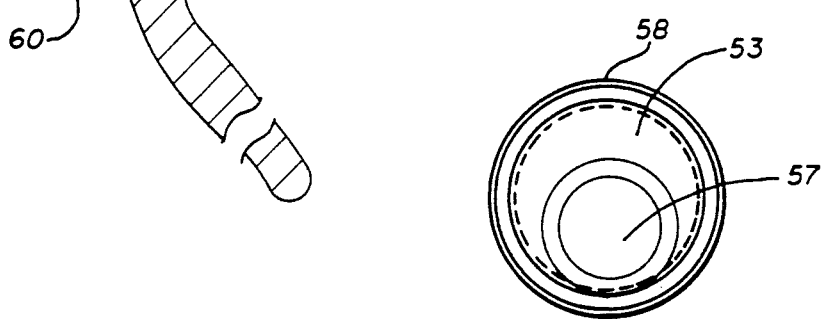
FIG. 7 is a right end view of the tool of FIG. 5.

The operation of this invention is best illustrated in connection with the specialized tool attachment illustrated in FIGS. 5 and 6. In FIG. 5 a drill generally designated 50 is shown including point 51, flutes 52, shank 53 and attachment portion 54. In contradistinction with conventional drill bits, the attachment portion 54 includes two sections which extend beyond the diameter of the shank portion. They are an annular stop 55 and a detent 56. The stop 55 is, in fact, a dual stop having a front surface 55A which serves as a stop and bearing surface for the drill when used in connection with a positioning device such as a tool holder 60 shown in FIG. 6. The stop 55 includes a rear stop surface 56 which mates with the throat 34 of FIG. 2. A detent portion 58 is configured to match the detent recess 36 of FIG. 3. Additionally, at the proximal end of the tool 50 may be found an eccentric extension 57 which matches in size and shape the recess 33 of the collet 13. This configuration of a tool proximal or attachment end 54 includes each of the foregoing surfaces, each cooperating to accurately position the tool coaxially with the collet 13 at a prescribed longitudinal position as defined by the mating stop surfaces 58, 59A and 59B on the tool with respective surfaces 37, 39 and 38 on the collet 13.

The tool 50 is further locked in rotational engagement with the collet 13 by means of the eccentric extension 57 engaging the recess 33. With extension 57 in recess 33 there can be no slippage of tool 50 in collet 13. The operating position when employing the collet of this invention with a tool of this invention can be assured with rapid interchange of tools and with precise longitudinal positioning and positive rotational engagement.

The eccentric extension behind the detent is shown to be an axially offset cylinder 57. However, a D-shape extension or multi faceted section also are asymmetrical or noncircular and can be employed with a matching collet detail.

The foregoing is accomplished by slightly loosening the ring lock 40, inserting the proximal or attachment end of the tool into the jaws 26 until extension 57 strikes the surface 32B which is tactually felt, rotating tool 50 with respect to the collet 11 until the tool definitely snaps inwardly with an audible snap of the detents and the tool 50 bottoming out in recess 32 and finally tightening the locking ring 40. The operation can be conducted without the use of one's eyes and one is both audibly and tactually assured of proper positioning and reliable drive of the tool.

Figures 8, 9:
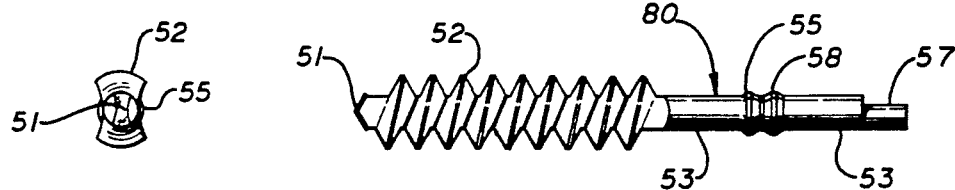
FIG. 8 is side elevational view of second tool, namely, a tap incorporating this invention for use with the drive of FIG. 1-4.
FIG. 9 is a left end view of the tool of FIG. 8.

Although described above in connection with use of a drill bit 50, it may be seen that other tools such as tap 80 of FIGS. 8 and 9 which contains each of the operative surfaces described above in connection with FIG. 5 and similarly numbered.

Figure 10:
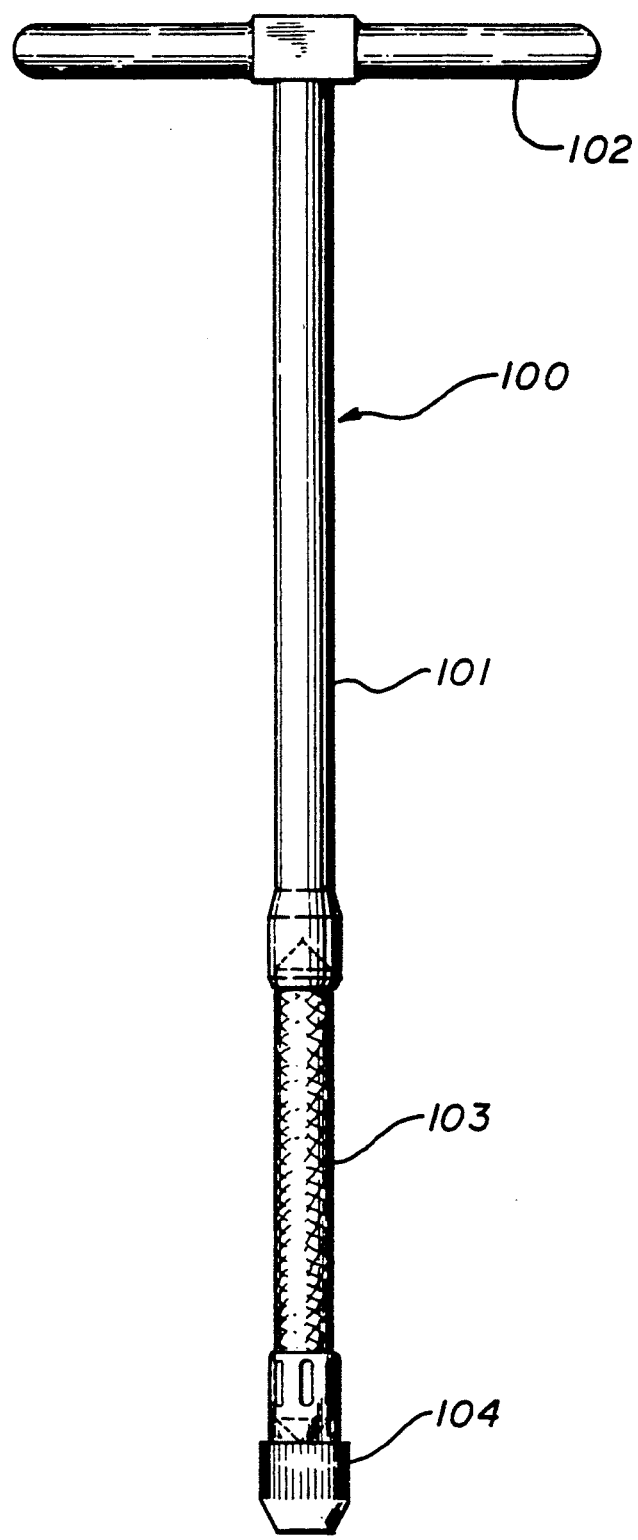
FIG. 10 is a longitudinal view of a manual tool holder employing a flexible drive incorporating the collet of this invention for use with the tools of this invention.

Although the principal use of this invention is in connection with power driven drills or taps, it may be applied as well to hand driven instruments such as the T-handled flexible drive of FIG. 10 having a rigid shank 101 with a transverse handle 102, a flexible drive section 103 and a collet of this invention 104.

The above described embodiments of the present invention are merely descriptive of its principles and are not to be considered limiting. The scope of the present invention instead shall be determined from the scope of the following claims including their equivalents.

What is claimed is:

1. A collet and interchangeable tool assembly including an elongated tool for rotatable engagement with workpieces, particularly in bone structure for the incorporeal implantation of replacement body parts comprising:

a collet which is adapted to be driven about a longitudinal axis thereof by a rotating power source;

said collet having a body portion with a rearward proximal end secured to a source of rotation and a forward distal end including internal surfaces defining a resilient jaw opening for receiving said tool to be held by said collet and driven by the source or rotating power;

said body including an internal recess communicating with and rearward said jaw opening and parallel to but eccentric with respect to the longitudinal axis of said collet;

said surfaces of said collet further defining a detent having axially spaced forwardly and rearwardly facing surfaces;

said collet operating in conjunction with said elongated tool for use with said collet, said tool including a workpiece end and a mounting end, said mounting end including a longitudinally extending protuberance corresponding to said internal recess in said collet to engage said recess for positive driving of said tool by said collet;

said tool further including a mating detent part for said detent of said surfaces defining said jaw opening of said collet and having axially spaced forwardly and rearwardly facing surfaces for simultaneously mating with said forwardly and rearwardly facing surfaces of said detent of said collet;

locking means engaging said collet for biasing said surfaces defining said resilient jaw opening detent engaging relationship with said tool; and wherein said tool further includes integral stop means extending beyond said collet to limit the extent of tool movement into a workpiece.

2. A collet and interchangeable tool assembly in accordance with claim 1 wherein:

said detent of said collet comprises an annular groove on the internal surfaces defining a resilient jaw opening of said tool comprises a matching annular protuberance.

3. A collet and interchangeable tool assembly in accordance with claim 1 wherein the jaw opening of said collet includes a surface which mates with a corresponding surface of said tool to limit longitudinal movement of said tool into said collet.

4. A collet and interchangeable tool assembly in accordance with claim 1 wherein the mating surfaces of said collet and tool detent are frusto-conical.

5. A collet and interchangeable tool assembly in accordance with claim 1 wherein said locking means comprises an internally threaded ring for engaging the jaw portion of the collet to prevent jaw opening.

6. A collet and interchangeable tool assembly in accordance with claim 5 wherein said jaw portion of said collet and said threaded ring include mating tapered engaging surfaces.

7. A collet for holding a tool for rotatable engagement with a workpiece comprising:

said collet having a body portion with a proximal rearward end secured to a source of rotation and a forward distal end including internal surfaces defining a resilient jaw opening for receiving a tool to be held by said collet and driven by the source of rotating power;

an internal recess in said body communicating with and rearward of said jaw opening parallel to but eccentric with respect to the longitudinal axis of said collet;

said surfaces of said collet further including an internally directed annular detent having an axially extending portion disposed between two coaxially disposed substantially frusto-conical surfaces facing each other on the internal surfaces defining said jaw opening; and a forwardly facing frusto-conical surface in the forward most portion of said internal surfaces defining a resilient jaw opening.

8. A rotatable tool for longitudinal movement relative to a workpiece, said tool including a forward working end, a shank, and a rearward attachment end;

said attachment end including:

a stop defining a limit of longitudinal positioning of said tool relative to said workpiece;

a detent rearward said stop cooperating with a mating tool holder to provide an audible indication of seating of the tool in its holder, said detent including an axially extending portion disposed between two coaxially disposed substantially frusto-conical surfaces oppositely oriented along the tool axis and on the attachment end;

an eccentric extension comprising a cylinder having a central axis which is displaced from and parallels the axis of rotation of the tool for engaging a mating eccentric portion of a tool holder whereby said symmetrical extension provides torque transmitting engagement with a tool holder; and a second stop facing toward the attachment end for limiting the entrance of the tool into said tool holder.

* * * * *